(12) United States Patent
Mackenzie

(10) Patent No.: US 10,871,099 B2
(45) Date of Patent: Dec. 22, 2020

(54) PISTON COOLING FOR OPPOSED-PISTON ENGINE

(71) Applicant: ACHATES POWER, INC., San Diego, CA (US)

(72) Inventor: Ryan G. Mackenzie, San Diego, CA (US)

(73) Assignee: Achates Power, Inc., San Diego, CA (US)

(*) Notice: Subject to any disclaimer, the term of this patent is extended or adjusted under 35 U.S.C. 154(b) by 259 days.

(21) Appl. No.: 15/687,368

(22) Filed: Aug. 25, 2017

(65) Prior Publication Data

US 2017/0370273 A1  Dec. 28, 2017

Related U.S. Application Data

(63) Continuation of application No. 14/596,855, filed on Jan. 14, 2015, now Pat. No. 9,759,119.

(51) Int. Cl.

| F01P 3/10 | (2006.01) |
|---|---|
| F02B 23/06 | (2006.01) |
| F02F 3/22 | (2006.01) |
| F01B 7/02 | (2006.01) |
| F02B 75/28 | (2006.01) |
| F01P 3/08 | (2006.01) |
| F01P 11/02 | (2006.01) |

(52) U.S. Cl.
CPC ............... *F01P 3/10* (2013.01); *F01B 7/02* (2013.01); *F02B 23/06* (2013.01); *F02B 75/28* (2013.01); *F02F 3/22* (2013.01); *F01P 3/08* (2013.01); *F01P 11/02* (2013.01); Y02T 10/12 (2013.01)

(58) Field of Classification Search
CPC .................. F01P 3/10; F01P 3/08; F02F 3/22
See application file for complete search history.

(56) References Cited

U.S. PATENT DOCUMENTS

| 3,703,126 | A | * | 11/1972 | Haug | F02F 3/20 |
| | | | | | 123/41.35 |
| 5,072,654 | A | | 12/1991 | MacGregor | 92/157 |
| 5,724,933 | A | | 3/1998 | Silvonen et al. | 123/193.6 |
| 6,019,071 | A | | 2/2000 | Maciejka, Jr. | 123/195 H |
| 6,120,189 | A | * | 9/2000 | Beagle | F16J 1/16 |
| | | | | | 384/255 |
| 6,491,013 | B1 | | 12/2002 | Gaiser et al. | 123/193.6 |

(Continued)

FOREIGN PATENT DOCUMENTS

| DE | 3702272 A1 | 10/1987 |
| DE | 19910092 A1 | 9/2000 |

(Continued)

OTHER PUBLICATIONS

Sammons, et al., "Napier Nomad Aircraft Diesel Engine", SAE Transactions, vol. 63, pp. 107-131, 1955.

(Continued)

*Primary Examiner* — Jacob M Amick
*Assistant Examiner* — Charles Brauch
(74) *Attorney, Agent, or Firm* — Terrance A. Meador

(57) ABSTRACT

Pistons for opposed-piston engines include an interior annular cooling gallery. The gallery is provided with inlet and drain passageways constructed to shield a jet of liquid coolant entering the gallery, thereby reducing interference between the incoming jet and liquid coolant circulating in the gallery.

14 Claims, 8 Drawing Sheets

(56) References Cited

U.S. PATENT DOCUMENTS

| | | | |
|---|---|---|---|
| 8,136,502 B2 | 3/2012 | Gildemeister et al. | 123/197.3 |
| 8,430,070 B2 | 4/2013 | Rebello | 123/41.35 |
| 8,601,996 B2 | 12/2013 | Miller et al. | 123/193.6 |
| 8,776,670 B2 | 7/2014 | Lapp et al. | 92/186 |
| 8,800,528 B2 | 8/2014 | Fuqua et al. | 123/301 |
| 8,863,718 B2 | 10/2014 | Rebello et al. | 123/193.6 |
| 9,038,593 B1 | 5/2015 | Kessler et al. | 123/193.6 |
| 9,163,505 B2 | 10/2015 | Dion et al. | F01B 7/08 |
| 9,169,800 B2 | 10/2015 | Matsuo | F02F 3/10 |
| 9,175,725 B2 | 11/2015 | Dion et al. | F16C 33/04 |
| 9,470,136 B2 | 10/2016 | Mackenzie | F01P 3/08 |
| 9,482,145 B2 | 11/2016 | Hofbauer et al. | F02B 17/005 |
| 2007/0028863 A1 | 2/2007 | Fiedler | 123/41.35 |
| 2010/0107868 A1 | 5/2010 | Scharp et al. | 92/159 |
| 2010/0212638 A1 | 8/2010 | Rado | 123/51 R |
| 2010/0258064 A1 | 10/2010 | Rebello | 123/41.35 |
| 2011/0041684 A1 | 2/2011 | Kortas et al. | 92/255 |
| 2012/0073526 A1* | 3/2012 | Dion | F01B 7/08 123/41.44 |
| 2013/0025561 A1* | 1/2013 | Gabriel | C23C 4/04 123/193.6 |
| 2013/0098316 A1 | 4/2013 | Sorin et al. | 123/41.35 |
| 2013/0213342 A1 | 8/2013 | Burton et al. | 123/193.6 |
| 2014/0014063 A1 | 1/2014 | Redon | 123/295 |
| 2014/0083396 A1 | 3/2014 | Burton et al. | 123/51 R |
| 2014/0238360 A1 | 8/2014 | Dion et al. | F16C 33/04 |

FOREIGN PATENT DOCUMENTS

| | | |
|---|---|---|
| DE | 102011007285 A1 | 10/2012 |
| FR | 2839116 A1 | 10/2003 |
| GB | 916696 A | 1/1963 |
| GB | 2431218 A | 4/2007 |
| JP | 6-49745 | 7/1994 |
| JP | 2011-117459 | 6/2011 |
| JP | 2013-539516 | 10/2013 |
| WO | WO 2012/023970 | 2/2012 |
| WO | WO-2012/023970 A2 | 2/2012 |
| WO | WO-2016/114968 A1 | 2/2012 |

OTHER PUBLICATIONS

International Search Report for PCT/US2011/001429, dated Mar. 12, 2012.

International Preliminary Report on Patentability for PCT/US2011/001429, dated Feb. 28, 2013.

International Search Report for PCT/US2016/012431, dated Apr. 19, 2016.

Non-Final Office Action dated Sep. 15, 2017, for U.S. Appl. No. 15/647,880.

Notification of First Office Action dated Feb. 27, 2019, issued by the State Intellectual Property Office of PRC, for Chinese Patent Application No. 2016800050703.

English translation of the Second Office Action dated Sep. 9, 2019, issued by the State Intellectual Property Office of PRC, for Chinese Patent Application No. 2016800050703.

Notification of Reasons for Refusal dated Aug. 27, 2019, for Japanese Patent Application No. 2017-537263.

Communication pursuant to Article 94(3) EPC dated Feb. 21, 2020, issued by the European Patent Office for European Patent Application No. 16703187.1.

* cited by examiner

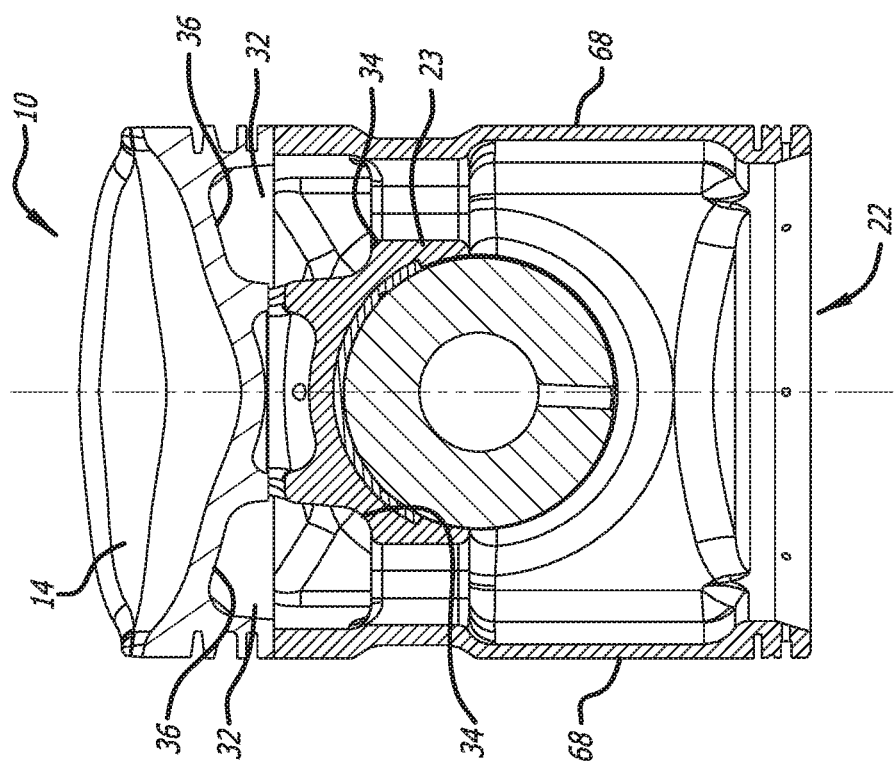
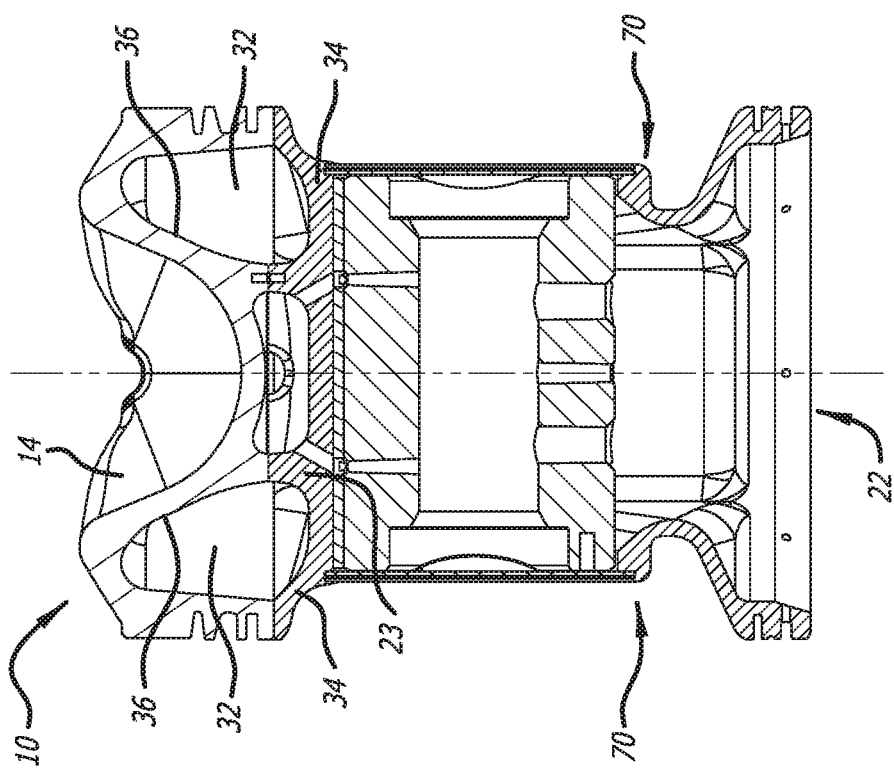
FIG. 3B
FIG. 3A

PISTON COOLING FOR OPPOSED-PISTON ENGINE

PRIORITY

This application is a continuation of U.S. application Ser. No. 14/596,855, filed on Jan. 14, 2015 for "Piston Cooling For Opposed-Piston Engines", which will issue as U.S. Pat. No. 9,759,119 on Sep. 12, 2017.

RELATED APPLICATIONS

This application contains subject matter related to the subject matter of the following commonly-owned US patent applications: Ser. No. 13/136,955, filed Aug. 15, 2011 for "Piston Constructions for Opposed-Piston Engines," published as US 2012/0073526 on Mar. 29, 2012; Ser. No. 13/776,656, filed Feb. 25, 2013 for "Rocking Journal Bearings for Two-Stroke Cycle Engines," published as US 2014/0238360 on Aug. 28, 2014; Ser. No. 14/075,926, filed Nov. 8, 2013 for "Lubricating Configuration For Maintaining Wristpin Oil Pressure In A Two-Stroke Cycle, Opposed-Piston Engine;" and, Ser. No. 14/199,877, filed Mar. 6, 2014 for "Piston Cooling Configuration Utilizing Lubricating Oil From A Bearing Reservoir In An Opposed-Piston Engine."

TECHNICAL FIELD

The technical field of this disclosure includes internal combustion engines, particularly two-stroke, opposed-piston engines. In one aspect, the technical field relates to cooling the pistons of opposed-piston engines.

BACKGROUND

The related patent applications describe two-stroke, opposed-piston engines in which pairs of pistons move in opposition to form shaped combustion chambers between their end surfaces. During a compression stroke, two opposed pistons move toward each other in the direction of respective top center locations in the bore of a ported cylinder. As the pistons near the top center locations, charge air is compressed between their end surfaces and fuel is injected through the side of the cylinder into the combustion chamber formed by the end surfaces. The heat of the compressed air ignites the fuel and combustion occurs. In response to combustion, the pistons reverse direction in a power stroke. During the power stroke, the pistons move away from each other toward bottom center locations in the bore. As the pistons reciprocate between top and bottom center locations they open and close ports formed in respective intake and exhaust locations of the cylinder in timed sequences that control the flow of charge air into, and exhaust from, the cylinder.

In some aspects of piston constructions for two-stroke, opposed-piston engines it is desirable to utilize pistons with crowns having contoured end surfaces that interact with swirl and with squish flow from the periphery of the combustion chamber to produce complex, turbulent charge air motion that encourages mixing of air and fuel. However, combustion imposes a heavy thermal load on the piston crowns. The contoured end surfaces create non-uniform thermal profiles that are not suitably cooled by conventional forced cooling configurations, leading to asymmetrical thermal stress, wear, and piston crown fracture. In order to increase piston durability and to contribute to effective thermal management of the engine, it is therefore desirable to provide piston constructions with the capability of cooling the contoured crowns of such pistons.

In some instances, a piston cooling construction for opposed pistons includes an internal annular cooling gallery in each piston through which a liquid coolant (for example, lubricating oil) circulates. See the related, commonly-owned U.S. patent application Ser. No. 13/136,955, published as US 2012/0073526, in this regard. The annular gallery follows the piston's periphery along the under surface of the crown; it is closed except for one or more openings and one or more slots in the gallery floor that respectively admit liquid coolant into and drain liquid coolant from the annular gallery. The dimension of the gallery in the longitudinal dimension of the piston (the height of the gallery) varies between a maximum where the gallery abuts a protruding ridge on the crown end surface and a minimum where the gallery abuts a notch on the end surface through which fuel is injected into the combustion chamber. An opening in the gallery floor provides entry for a jet of liquid coolant transmitted through an open end of the piston skirt. In some instances, these openings are located so as to allow the jets of liquid coolant to strike a portion of the crown under surface lying abutting a ridge on the end surface because the ridge bears a heavy thermal load during engine operation. In some instances, liquid coolant is drained from the annular gallery at about the same level at which the jet enters the gallery. Drained liquid coolant flows into the interior of the piston skirt and then out the open end.

Taking into account oscillation of each of the opposed pistons during high speed operation of the engine and suboptimal drainage through the central gallery, liquid coolant can collect and dwell in a creased portion of an annular gallery under a ridge, creating a standing body of liquid coolant. If a jet is aimed at this portion the standing body of liquid coolant can attenuate the impingement effects of the jet and impair circulation of the liquid within the gallery.

It is desirable for liquid coolant to enter the annular gallery unimpeded and to reach and flow across the crown under surface so as to ensure effective cooling. Further, it is desirable for the liquid coolant to drain unimpeded from the gallery. However, when coolant enters and drains at the same level in the gallery, accumulated coolant in the gallery can disrupt an incoming jet and conversely, an incoming jet can disrupt the coolant moving in the gallery. Either or both of these effects can result in suboptimal circulation through the gallery and muted cooling performance.

It is therefore desirable to improve circulation of liquid coolant in the piston cooling gallery by protecting the incoming jet and reducing or eliminating interference between incoming and effluent streams of liquid coolant in the gallery.

SUMMARY

An objective of the piston cooling gallery described in this disclosure is to protect or shield an incoming liquid coolant jet from coolant already present in the gallery. A further objective is to separate and position inlet and drain passageways in the piston cooling gallery in such a way as to improve the circulation of liquid coolant therethrough.

Preferably, a cooling gallery construction for pistons of opposed-piston engines includes separate inlet and drain passageways with respective openings at differing distances from the crown under surface. In some aspects, the outlet opening of an inlet passageway through which an incoming jet of coolant enters the cooling gallery is closer to the crown under surface than the drain opening of a drain passageway.

In further aspects, the difference in distance is due, at least in part, to placement of the drain opening of the drain passageway in a bowl-shaped depression in the cooling gallery.

In other aspects, the inlet passageway extends out of the bowl-shaped depression in the direction of the crown under surface.

In still other aspects, the inlet passageway is positioned so as to aim a jet of liquid coolant at a portion of the crown under surface having a convex shape.

A piston for an opposed-piston engine constructed according to this disclosure has a longitudinal axis, a crown, and a skirt part with a piston sidewall. The crown has an end surface shaped to define a combustion chamber with the end surface of an opposing piston in the engine. The piston sidewall extends along the longitudinal axis from the crown to an open end of the skirt. An annular cooling gallery within the piston is defined between an interior wall of the skirt and an under surface of the crown. At least one coolant inlet passageway in the interior wall includes an outlet opening in the cooling gallery from which a jet of liquid coolant emerges into the gallery. At least one coolant drain passageway in the interior wall includes a drain opening in the cooling gallery. The outlet opening is positioned a first distance from the crown under surface, and the drain opening is positioned at a second distance from the crown under surface which is greater than the first distance.

In some aspects, the drain opening is located in a bowl in the interior wall that faces the crown under surface. In some further aspects, the drain passageway and the inlet passageway extend along a longitudinal portion of the piston sidewall that runs between indented portions of the piston sidewall.

In an embodiment of the piston, the piston sidewall includes longitudinal skirt portions running from the crown to the open end that are separated from one another by intervening sidewall indentations running between the crown and the open end. An interior wall of the skirt within the sidewall includes a wristpin bore that extends between opposing sidewall indentations. An annular cooling gallery within the piston is defined between the interior wall and an under surface of the crown. At least one coolant inlet passageway having an outlet opening in the cooling gallery and at least one coolant drain passageway having a drain opening in the cooling gallery are formed in the interior wall in the vicinity of a longitudinal skirt portion. The outlet opening is positioned a first distance from a convex portion of the crown under surface, and the drain opening is positioned at a second distance from the convex portion of the crown under surface which is greater than the first distance.

BRIEF DESCRIPTION OF THE DRAWINGS

FIG. 3A is a side sectional view of the piston of FIG. 1 through a plane that includes the longitudinal axis of the piston and the axis of a wristpin. FIG. 3B is a side sectional view of the piston of FIG. 1 through a plane that includes the longitudinal axis of the piston and is orthogonal to the axis of the wristpin.

DETAILED DESCRIPTION OF THE PREFERRED EMBODIMENTS

In this description, the term "jet" is intended to refer to a forceful stream or flow of liquid coolant discharged from a narrow opening. In the relevant arts, "jet" may also refer to a nozzle or tube through which the forceful stream or flow of liquid coolant is delivered for use. In this latter regard, we have chosen, for clarity's sake, to use the term "nozzle" so as to avoid confusing the stream from its channel, without intending to exclude other terms that are synonymous with nozzle, including "jet".

Figure 1:
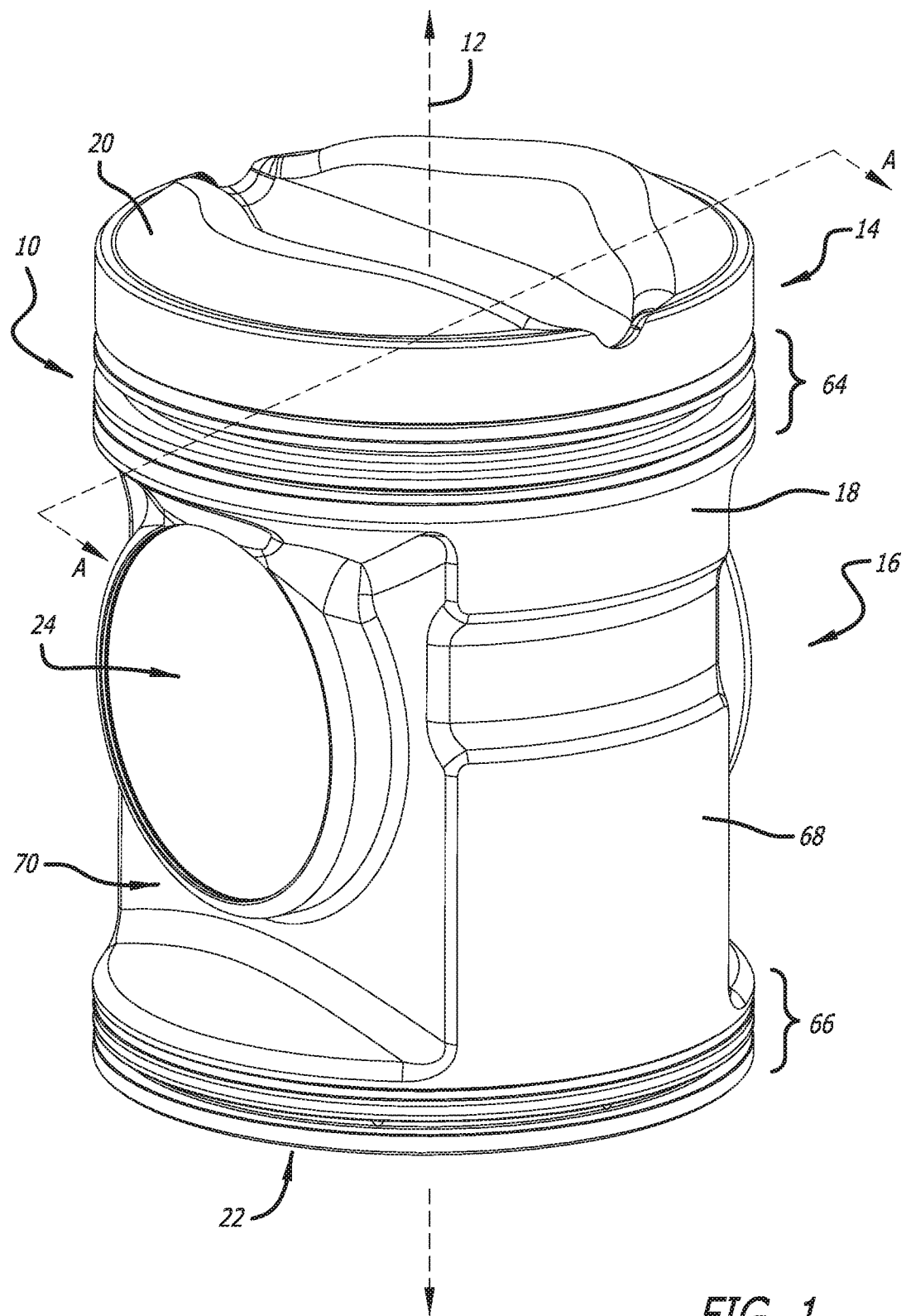
FIG. 1 is an isometric view of a piston constructed for use in an opposed-piston engine, in which piston cooling aspects and embodiments according to this disclosure are incorporated.

FIG. 1 illustrates an example of a piston 10 for an opposed-piston engine constructed according to this disclosure. The piston 10 has a longitudinal axis 12, a crown 14, and a skirt part 16 with a piston sidewall 18. The piston sidewall 18 is generally cylindrical and extends along the longitudinal axis 12. The crown 14 has an end surface 20 shaped to define a combustion chamber with the end surface of an opposing piston in the engine. The shape of the end surface 20 shown in FIG. 1 limits the scope of this disclosure only to the extent that it cooperates with the end surface of an opposing piston to define a shape of a combustion chamber in an opposed-piston engine. Many other such end surface shapes are possible; see, for example, and without limitation, the end surface shapes for pistons of opposed-piston engines that are described and illustrated in US 2013/0213342 A1, US 2014/0014063 A1, US 2014/0083396 A1, and U.S. Pat. No. 8,800,528 B2.

Figure 2:
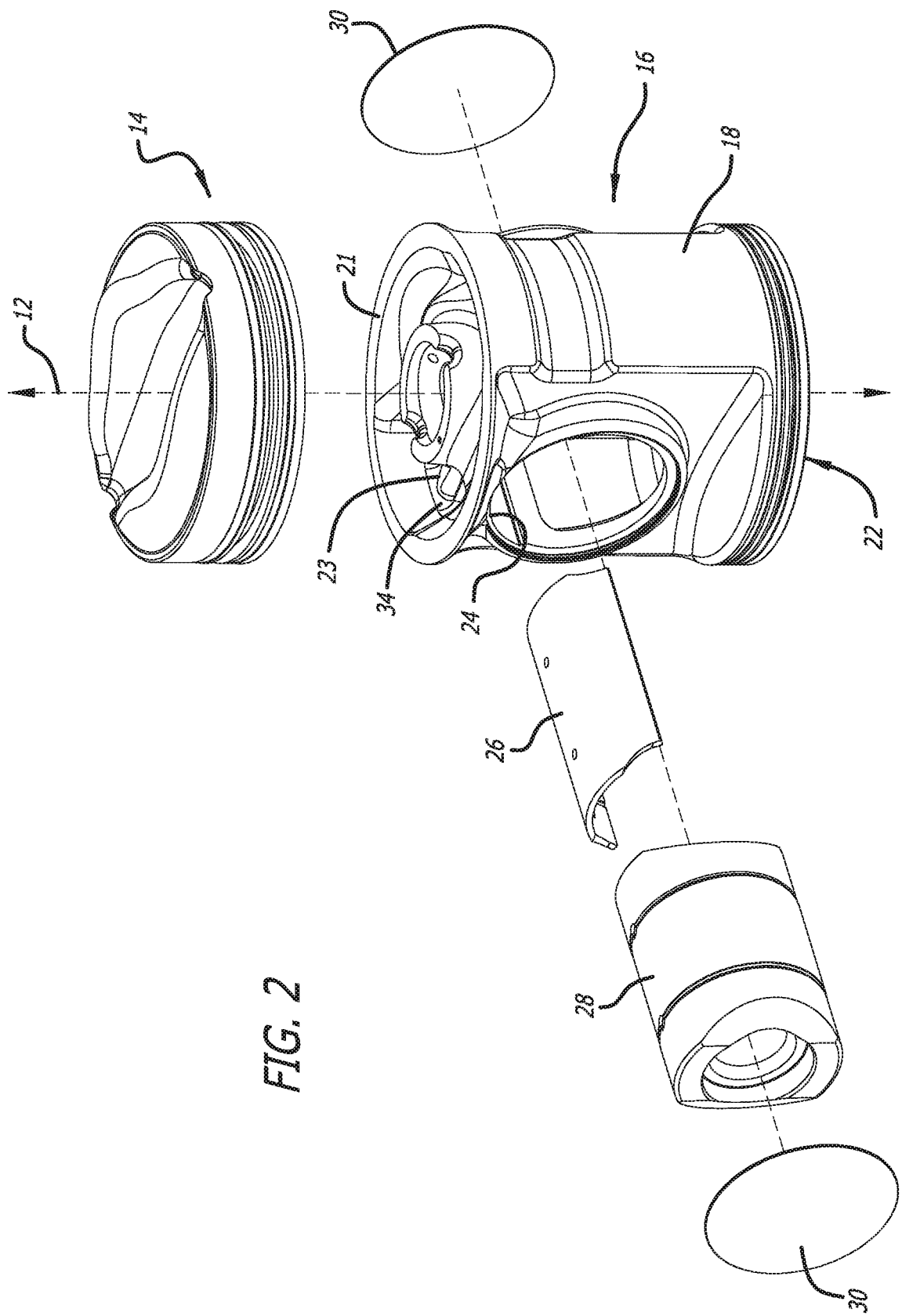
FIG. 2 is an exploded view of the piston of FIG. 1.

With reference to FIGS. 2, 3A and 38, the sidewall 18 runs from a first end 21 (see also FIG. 5) to a second end 22 (see also FIG. 6) of the skirt part 18. As best seen in FIGS. 3A, 3B, and 6, the second end is open. An interior wall 23 of the skirt that is centered on the longitudinal axis 12 is situated in the sidewall near the first end 21. In some aspects, the interior wall 23 includes support structures for a wristpin and a cooling chamber. Preferably, but not necessarily, the interior wall 23 on one side (seen in FIG. 6) defines a portion of a wristpin bore 24 where a wristpin is received and retained. The wristpin may comprise, for example and without limitation, a biaxial bearing unit as described and illustrated in US 2014/0238360 A1. In this regard, a bearing sleeve 26 is received in the wristpin bore 24 where it supports a wristpin journal 28 against the one side of the interior wall 23 for oscillatory rocking during engine operation. Discs 30 retain the sleeve 26 and journal 28 in the wristpin bore 24. Preferably, the interior wall 23 on the opposite side (seen in FIG. 5) defines a portion of an annular cooling gallery 32. As per FIGS. 3A and 3B, the interior wall 23 includes a structural base for the annular cooling gallery 32 within the piston 10. The gallery 32 is defined between an outer peripheral section 34 of the interior wall 23 and an outer peripheral portion of the under surface 36 of the crown 14. The annular cooling gallery 32 is closed except for inlet and drain passageways 38 and 42 in the interior wall 23 (best seen in FIGS. 5 and 6).

The materials and methods of construction of the piston 10 are conventional for medium and/or heavy duty use or for large bore applications. For example, the crown and skirt part may be formed separately of compatible materials (e.g., forged steel crown, cast iron skirt part) and joined by welding or brazing.

Figure 4:
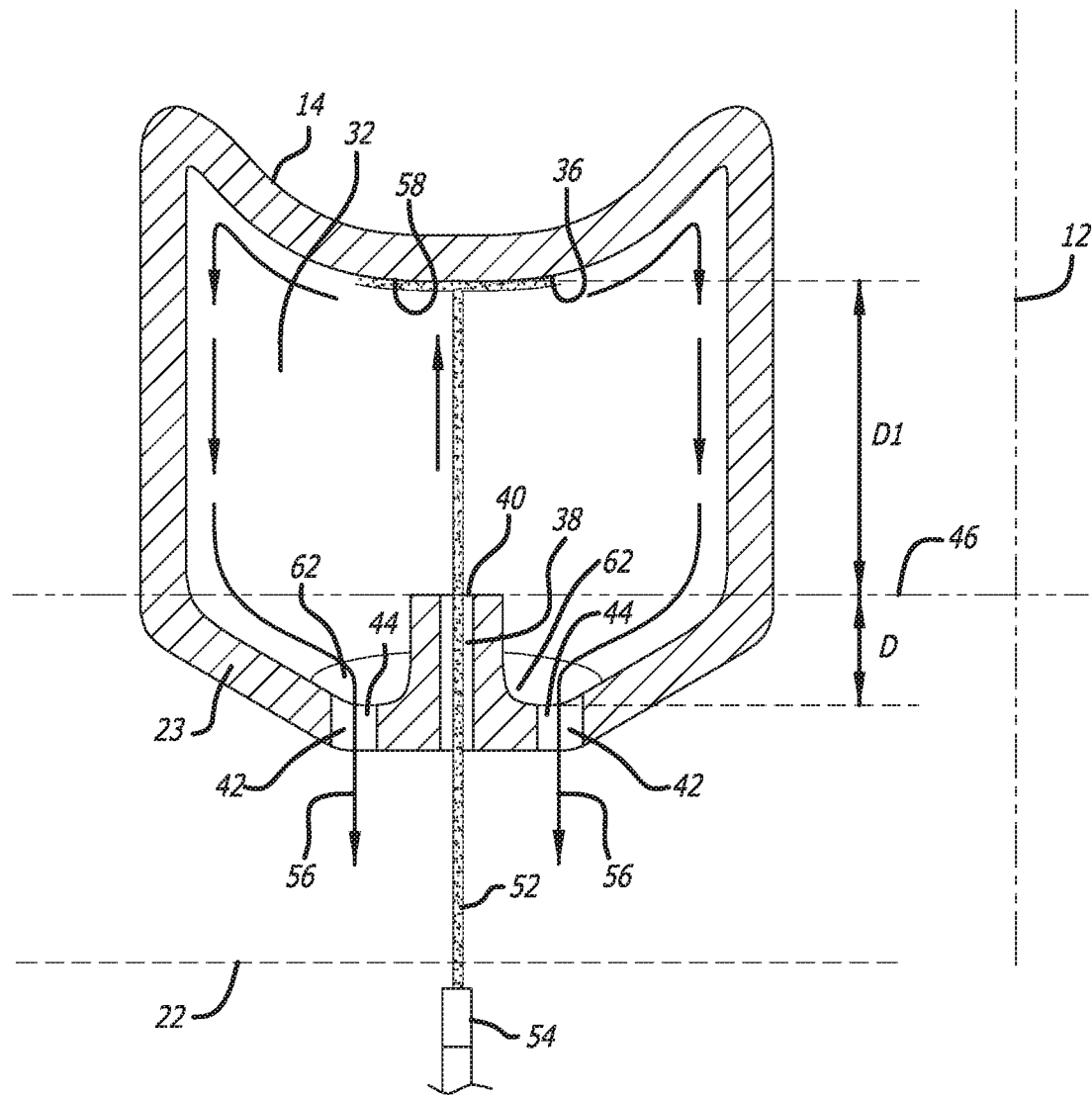
FIG. 4 is a conceptual schematic representation of piston cooling according to this disclosure.

FIG. 4 is a conceptual schematic cross-section of a portion of the cooling gallery 32 that represents principles of piston cooling according to this disclosure. In this regard, at least one coolant inlet passageway 38 running in the interior wall 23 includes an outlet opening 40 in the cooling gallery 32. At least one coolant drain passageway 42 in the interior wall 23 includes a drain opening 44 in the cooling gallery 32. The coolant outlet opening 40 is positioned in a reference plane 46 that divides the cooling gallery into first and second portions and is orthogonal to the longitudinal axis 12. The drain opening 44 is positioned at a distance from the reference plane 46 in the direction of the open end 22 of the skirt. From this aspect, the outlet opening 40 is nearer the crown under surface 36 than the drain opening. From another aspect, the coolant outlet and drain openings 40 and 44 are separated within the piston by a longitudinal distance D, with the coolant drain opening 44 being nearer to the open end of the skirt than the coolant outlet opening 40. From yet another aspect, the outlet opening 40 is positioned a first distance $D_1$ from the under surface 36 of the crown 14, each drain opening 44 is positioned a second distance $D_2=(D+D_1)$ from the under surface of the crown, and the second distance is greater than the first distance ($D_2>D_1$). From any point of view, an infusing jet 52 of liquid coolant transmitted from a dedicated nozzle 54 aimed at an open end of the piston skirt travels through the inlet passageway 38 and enters the cooling gallery 32 through the outlet opening 40 at a level nearer the crown under surface 36 than the level from which the coolant is drained through the drain openings 44. The arrangement of the outlet and drain openings 40 and 44 at these different levels separates and reduces interference between the infusing jet 52 and liquid coolant in the cooling gallery 32, including an effusing flow of liquid that passes through the drain opening 44 and travels within the skirt part 16 toward and through the open end 22. From another aspect, the separation of the inlet and drain passageways, and the placement of the outlet and drain openings at different levels of the annular cooling gallery 32 shields the jet 52 from liquid coolant circulating in the cooling gallery.

In some aspects, the outlet opening 40 is positioned in alignment with a convex portion 58 of the under surface 36. In these cases, the jet 52 of liquid coolant spreads when it strikes the under surface 36 and avoids collection increases that may be found in some embodiments of the under surface 36. In some other aspects, there are two coolant drain passageways 42 with respective drain openings 44 positioned at the distance D from the reference plane 46. The drain openings 44 flank the inlet passageway 38 on either side, thereby flushing liquid coolant from the cooling gallery on either side of the outlet opening.

Figure 5:
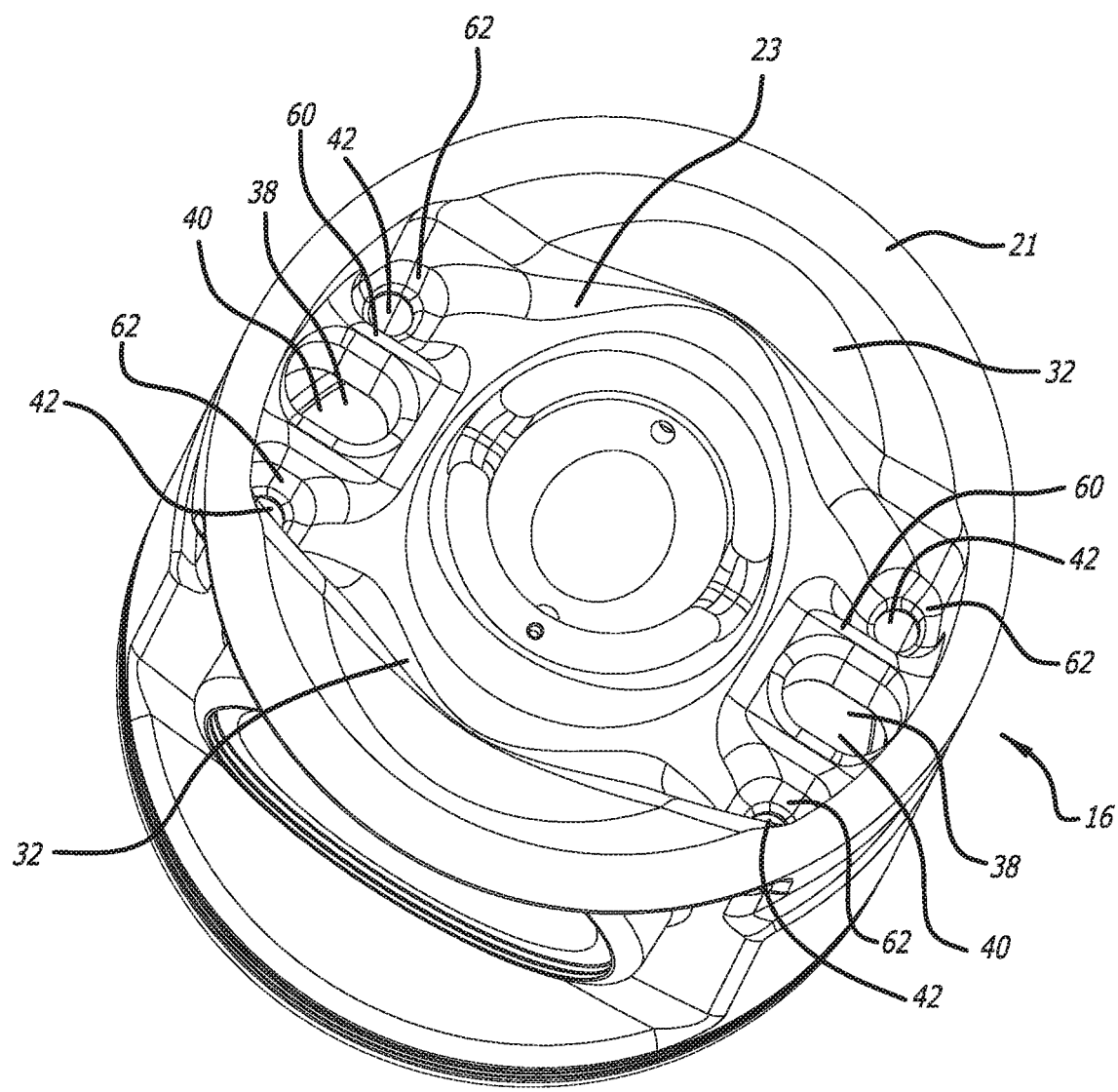
FIG. 5 is an isometric view into a skirt part of the piston of FIG. 1, showing inet and drain openings in the cooling gallery.
Figure 6:
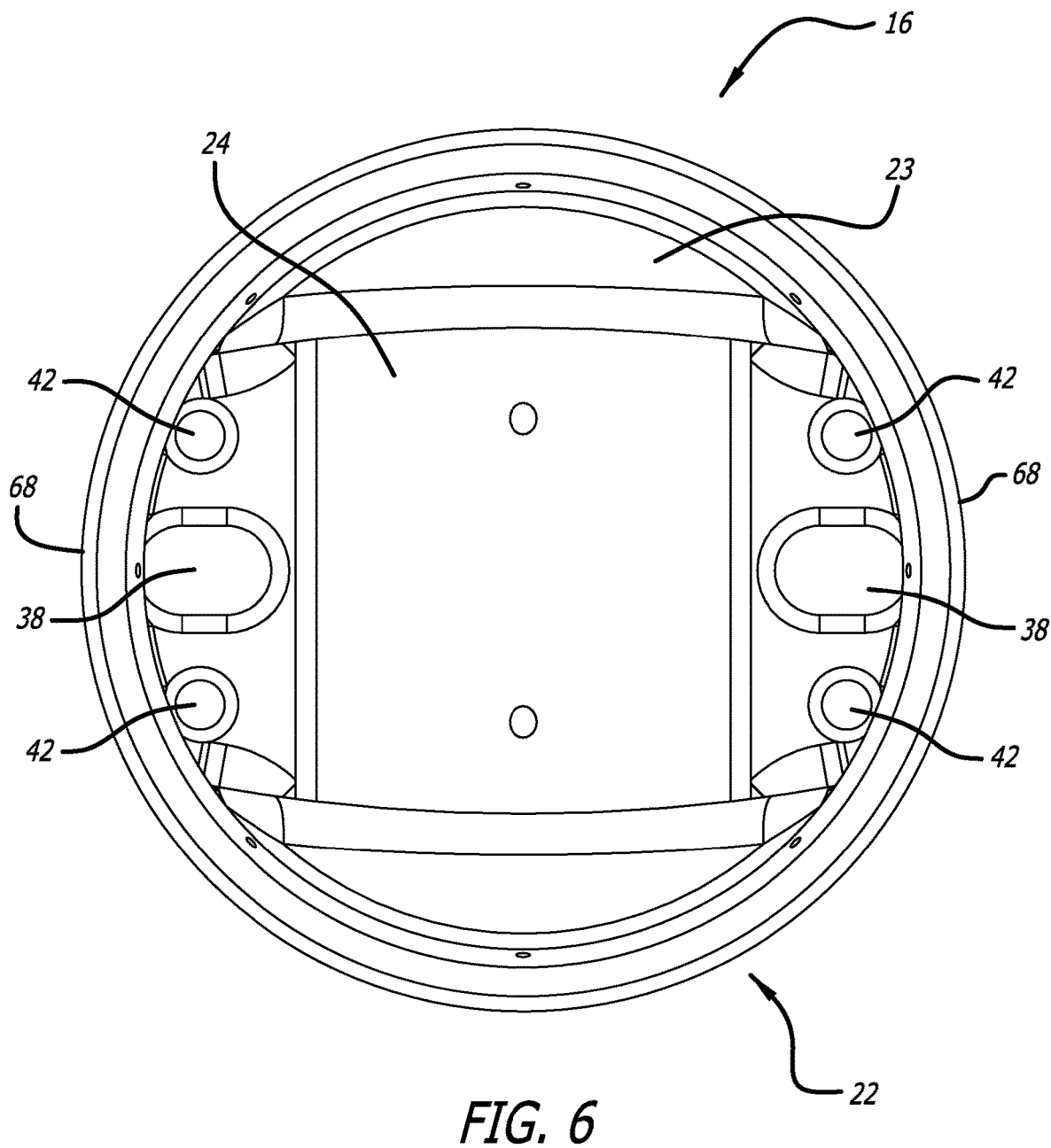
FIG. 6 is a view along the longitudinal axis of the piston of FIG. 1 into an open end of the skirt part of FIG. 1.

A preferred embodiment of the skirt part 16 showing an example of construction of the interior wall 23 near the first end 21 the skirt part 16 is seen from the point of view of the crown under surface in FIG. 5 and is seen through the open end 22 of the skirt part in FIG. 6. In this preferred embodiment, there are two coolant inlet passageways 38 on opposite sides of the cooling gallery 32. Preferably, the inlet passageways 38 extend through the interior wall 23 and include respective chimneys (or pipes, or tubes) 60 in the cooling gallery 32 that extend in the direction of the crown under surface. Preferably, but not necessarily, the inlet passageways have the oblong shape of a stretched circle. In this embodiment, the outlet openings 40 are in the ends of the chimneys 60. Two drain passageways 42 that flank each inlet passageway 38 extend through the interior wall 23. Each drain passageway is positioned at the bottom of a respective bowl 62 formed in the interior wall 23. Advantageously, the bowl and chimney configuration affords a desirably substantial distance D separating an outlet opening 40 from either or both of its flanking drain openings 44. Preferably, but not necessarily, the inlet passageways have oblong shapes in cross-section, as would be formed by a stretched circle, per the plan view of FIG. 6. Preferably, but not necessarily, the drain passageways have circular shapes in cross-section per the plan view of FIG. 6.

A representative embodiment of the piston 10 with cooling according to this disclosure is shown in FIGS. 1, 3A, 3B, and 7. As per these figures, the outer peripheral surface of the crown 14 is formed with a first set of ring grooves 64. A second set of ring grooves 66 is formed in a portion of the sidewall 18 near the open end 22 of the skirt. In this embodiment, the sidewall 18 is formed with opposing sidewall portions 68 separated from one another by intervening sidewall indentations 70. For example, there are two opposing side wall sections 68 and two opposing indentations 70. The indentations 70 minimize both the mass of the piston and contact area of the sidewall felt by the bore of a cylinder in which the piston is disposed. The sidewall portions 68 extend from the crown 14 to the open end 22 of the skirt. Relative to the longitudinal axis 12, the portions 68 of the sidewall have the same radius as the crown 14 and the circumferential portion of the sidewall where the second set of ring grooves 66 is situated. The indentations 70 run longitudinally in the sidewall 18 between the first ring grooves 64 and the second ring grooves 66. As best seen in FIG. 6, there are inlet passageways 38 on opposite sides of the wristpin bore 24. Each inlet passageway 38 is positioned adjacent to (or, abuts) a respective sidewall portion 68, where it is flanked on each side by a respective one of two drain passageways 42.

Figure 8:
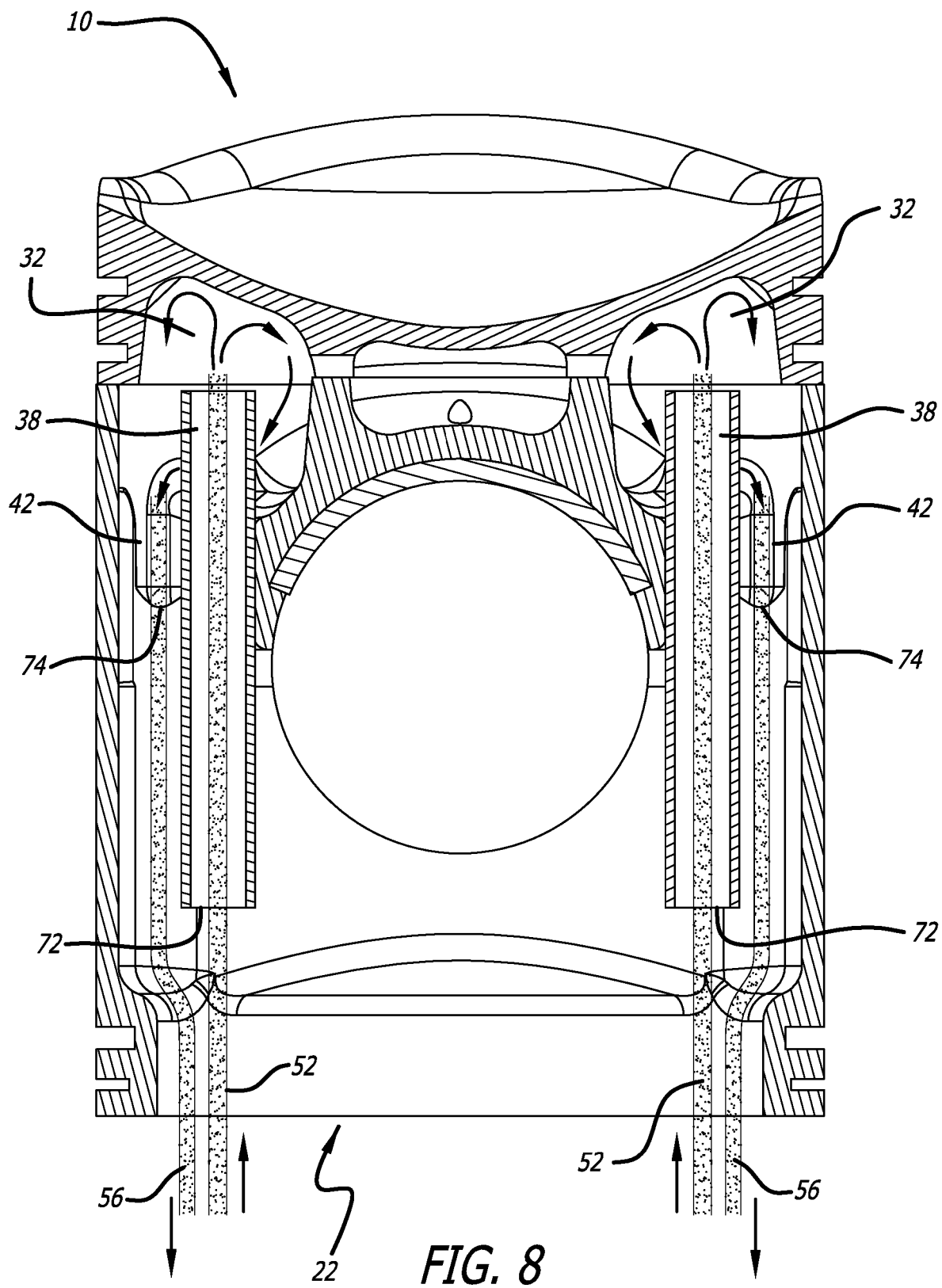
FIG. 8 illustrates an alternative inlet passageway embodiment.

As per FIGS. 5 and 6, the inlet and drain passageways may be formed integrally with the interior wall 23 by casting, forging, and/or machining the skirt part. Alternatively, as per FIG. 8, inlet passageways 38 may be constructed separately and then pressed, sintered, or welded into place in the interior wall 23. It may be advantageous in some applications to extend the inlet opening 72 of the inlet passageway beyond the outlet opening 74 of the drain passageway so that each jet 52 of liquid coolant enters the inlet passageway 38 at a point nearer the open end 22 of the skirt than the outlet opening 74 of the drain passageway, thereby extending the shielding effect of the inlet passageway beyond the cooling gallery 32.

Figure 7:
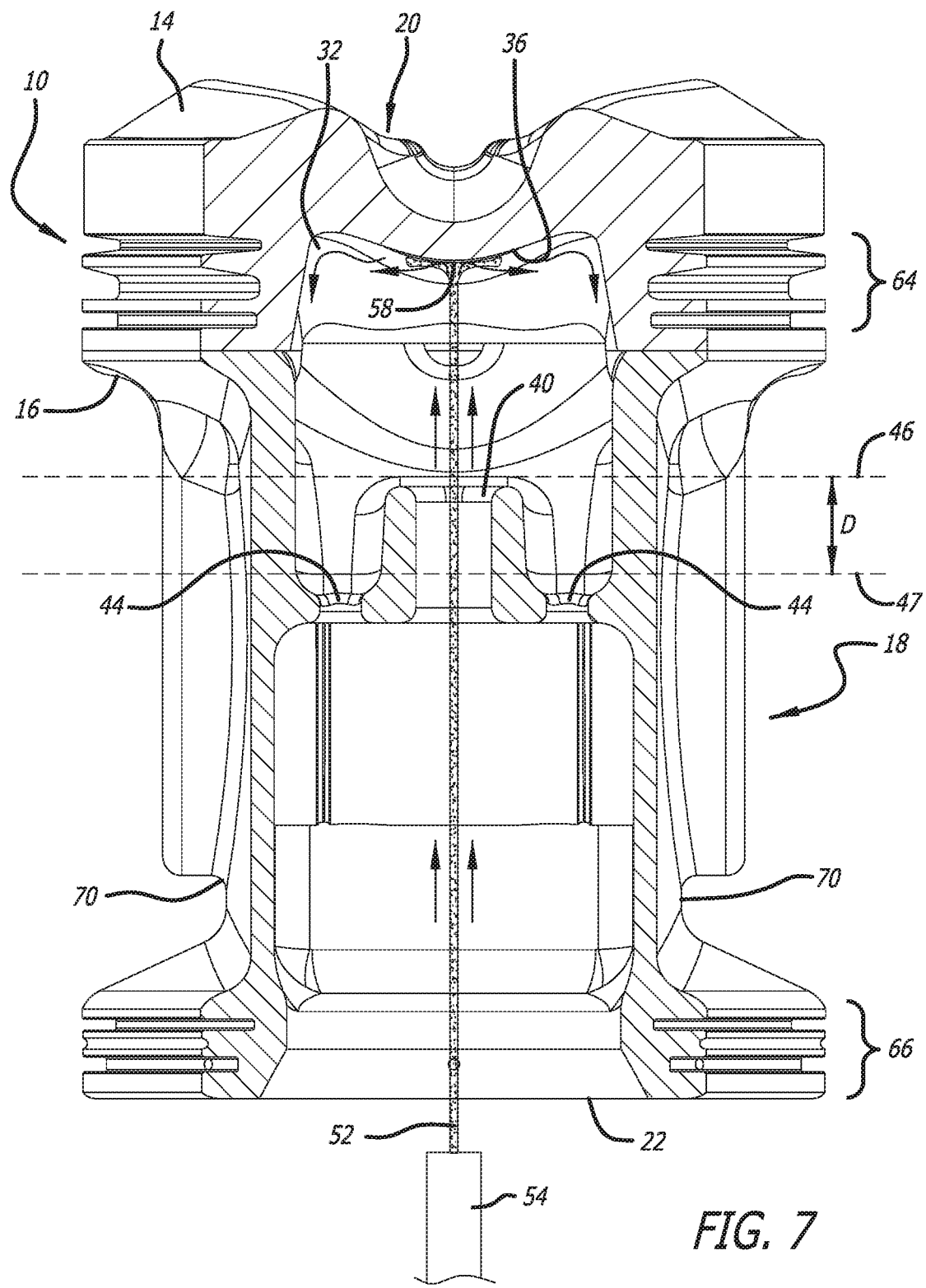
FIG. 7 is a side sectional view of the piston of FIG. 1 through a plane that corresponds to the sight lines A-A in FIG. 1.

FIGS. 4 and 7 illustrate a method of cooling a piston 10 that has a crown 14 with an end surface 20 shaped to define a combustion chamber with an end surface of an opposing piston in an opposed-piston engine, a skirt part 16 joined to the crown, and an annular cooling gallery 32 within the piston defined between the crown and the skirt part. The method includes providing at least one jet 52 of liquid coolant aimed at a convex portion 58 of the under surface 36 of the crown from a first level 46 in the annular cooling gallery 32, and draining the liquid coolant from a second level 47 in the annular gallery 32 that is further from the under surface 36 than the first level. In some aspects, draining the liquid coolant from the second level includes draining the liquid coolant at respective sides of the inlet passageway 38 through which the jet travels into the annular gallery 32. In further aspects, the method includes providing respective jets of liquid coolant in opposite sides of the annular gallery 32.

Viewed alternatively, FIGS. 4 and 7 illustrate another method of cooling a piston that has a crown with an end surface shaped to define a combustion chamber with an end surface of an opposing piston in the opposed-piston engine, a skirt part joined to the crown, and an annular cooling gallery within the piston defined between the crown and the skirt part. This method includes providing at least one jet 52 of liquid coolant aimed at an under surface 36 of the crown from an outlet 40 in the annular cooling gallery, and shielding the jet 52 of liquid coolant from liquid coolant circulating in the annular gallery.

Although piston cooling according to this disclosure has been described with reference to specific examples and embodiments, it should be understood that various modifications can be made without departing from the spirit of the underlying principles. Accordingly, the scope of invention to be accorded hereto is limited only by the following claims.

The invention claimed is:

1. A piston for an opposed-piston engine, comprising:
    a crown with an end surface shaped to define a combustion chamber with an end surface of an opposing piston in an opposed-piston engine;
    a separate skirt part joined to the crown and including a piston sidewall extending from the crown to an open end of the skirt part;
    an annular cooling gallery defined between the crown and the skirt part;
    a first set of ring grooves formed in an outer peripheral surface of the crown;
    a second set of ring grooves formed in a portion of the sidewall near the open end of the skirt;
    the sidewall comprising two opposing sidewall portions separated from one another by two intervening sidewall indentations; and,
    a wristpin bore extending between the sidewall indentations,
    wherein the crown and the skirt part are formed separately of compatible materials and are joined by welding or brazing.

2. The piston of claim 1, wherein the sidewall portions extend from the crown to the open end of the skirt, and the indentations run longitudinally in the sidewall between the first ring grooves and the second ring grooves.

3. The piston of claim 1, in which the skirt part has an interior wall near a first end of the sidewall and the annular cooling gallery is defined between a first side of the interior wall and an under surface of the crown.

4. The piston of claim 3, in which a second side of the interior wall opposite the first side includes at least a portion of a wristpin bore.

5. The piston of any one of claims 1-4, comprising a wristpin received in the wristpin bore.

6. The piston of claim 5, in which the wristpin comprises a biaxial bearing unit.

7. The piston of claim 6, in which the biaxial bearing unit comprises a bearing sleeve received in the wristpin bore and a wristpin journal supported by the bearing sleeve for oscillatory rocking during operation of the opposed-piston engine.

8. A piston for an opposed-piston engine, the piston having a longitudinal axis and comprising:
    a crown with an end surface shaped to define a combustion chamber with an end surface of an opposing piston in an opposed-piston engine;
    a separate skirt part joined to the crown;
    the crown including first ring grooves;
    the skirt part including second ring grooves spaced apart from the first ring grooves along the longitudinal axis;
    the skirt part including a piston sidewall with opposing sidewall portions separated from one another by intervening sidewall indentations running along the longitudinal axis between the first and second ring grooves;
    an annular cooling gallery within the piston;
    a wristpin bore extending between the sidewall indentations,
    wherein the crown and the skirt part are formed separately of compatible materials and are joined by welding or brazing.

9. The piston of claim 8, wherein the sidewall portions extend from the crown to an open end of the skirt.

10. The piston of claim 8, in which the skirt part has an interior wall near a first end of the sidewall and the annular cooling gallery is defined between a first side of the interior wall and an under surface of the crown.

11. The piston of claim 10, in which a second side of the interior wall opposite the first side includes at least a portion of a wristpin bore.

12. The piston of any one of claims 8-11, comprising a wristpin received in the wristpin bore.

13. The piston of claim 12, in which the wristpin comprises a biaxial bearing unit.

14. The piston of claim 13, in which the biaxial bearing unit comprises a bearing sleeve received in the wristpin bore and a wristpin journal supported by the bearing sleeve for oscillatory rocking during operation of the opposed-piston engine.

* * * * *